March 7, 1950     J. R. HALL     2,500,031
MATERIAL DISCHARGE STRUCTURE FOR HAMMER MILLS
Filed Aug. 17, 1946
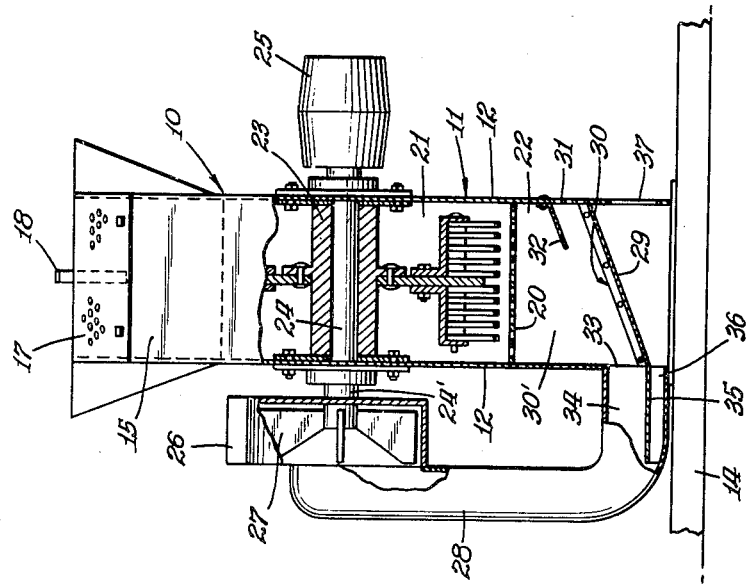
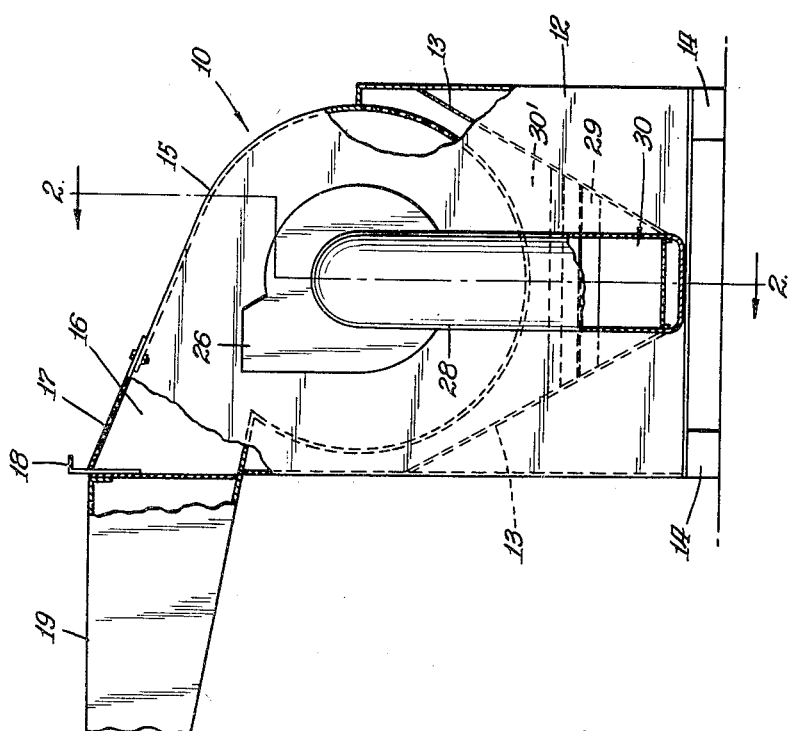
Inventor:
John R. Hall
By Paul O. Pippel
Atty.

Patented Mar. 7, 1950

2,500,031

UNITED STATES PATENT OFFICE 2,500,031

MATERIAL DISCHARGE STRUCTURE FOR HAMMER MILLS

John R. Hall, Chicago, Ill., assignor to International Harvester Company, a corporation of New Jersey Application August 17, 1946, Serial No. 691,356

1 Claim. (Cl. 241—41)

1

This invention relates to a mill of the type commonly used for the comminution of material such as feed or the like. More specifically it relates to an improved construction for facilitating the removal of pulverized material from the receiving chamber of a mill.

The present invention contemplates and has for its principal object a mill construction containing improved means for facilitating the removal of pulverized material from said mill.

Another object is the provision of an improved receiving chamber for a mill, said chamber including an inclined narrow trough for facilitating the discharge of pulverized material to a suction conveyor.

Still another object is the provision of an improved suction means for removing pulverized material from the receiving chamber of a mill, said chamber being in communication with the atmosphere and providing an incoming stream of air which directs the pulverized material toward a conduit in communication with a suction device.

A still further object is the provision of an improved mill having a receiving chamber, said receiving chamber including an inclined lower wall serving to deflect material toward the material inlet opening of a conduit in communication with a suction device.

Other and more specific objects of the invention will appear from the following detailed description taken in conjunction with the accompanying sheet of drawings, in which:

Figure 1 is a side elevational view of a mill of conventional form having portions broken away to better illustrate relevant parts of the invention.

Figure 2 is an end view of the same structure taken substantially along the line 2—2 of Figure 1.

The mill chosen for the purposes of illustration is of the type commonly used for reducing feed for live stock. As indicated in the drawing by the numeral 10, the mill comprises a casing 11 which is formed by a pair of upstanding spaced side walls 12. A pair of end walls 13 are connected between the side walls 12 and converge as best shown in Figure 1 toward a pair of skids 14 on which the mill 10 is carried. An upper section 15 of the casing 11 is formed with a feed throat 16. The feed throat 16 is in communication with the atmosphere by a perforated screen or element 17. A sliding door 18 is adapted to be moved into or out of closed position to open or close the feed throat 16 with respect to a feed chute 19.

Positioned between the side walls 12 and con-

2 nected thereto is an arcuate screen 20. The arcuate screen 20 divides the casing 11 into a material reducing or comminution chamber 21 and a material receiving chamber 22. A rotor 23 of the conventional hammer type is mounted for rotation with a shaft 24 pivotally journaled in the side walls 12. A pulley 25 is connected for rotation to one end of the shaft 24. The pulley 25 may be suitably driven from any conventional type of power unit.

A shaft extension 24' projects outwardly of one of the side walls 12. The shaft extension extends into a blower housing 26 which suitably encloses a fan or blower 27 which is rigidly connected for rotation with the shaft extension 24'. A conduit 28 is in communication with the blower housing 26.

The lower portion of the casing 11 is provided with a diagonally extending plate 29. The plate 29, in conjunction with the converging end walls 13, forms a diagonally extending trough indicated by the reference character 30 which is a part of a material receiving chamber 30'. An air inlet 31 is formed in one of the side walls 12 and provides for communication of the chamber 30' with the atmosphere. The air inlet 31 is formed by a perforated portion of the wall 12, said air inlet being positioned immediately adjacent to and above the uppermost portion of the diagonally extending plate 29. A baffle 32, substantially parallel to the plate 29, is positioned above the air inlet opening 31. Opposite the air inlet opening 31 is an opening 33 formed in the side wall 12. The opening 33 is positioned at the lowermost portion of the trough 30 and is in communication with a material receiving inlet 34 formed in the conduit 28. The end of the conduit 28, as best shown in Figure 2, is provided with a baffle 35 serving as the upper wall of an air inlet 36. The air inlet 36 is in communication with the atmosphere by means of an opening 37.

The operation of the mill previously described is generally conventional. Material to be reduced is fed into the feed throat 17 whereupon it comes in contact with the rotating hammers and is thereupon pulverized. The pulverized material falls through the screen 20 into the material receiving chamber 30'. The suction created by the fan 27 draws this material into the conduit 28 from which it is subsequently conveyed to a predetermined place or gathering means. In the conventional mill great difficulty has been encountered in removing the pulverized material. This difficulty has been due to the clogging and packing of the pulverized material in the area of the opening 33. In the present construction the material inlet opening 34, of the suction conduit 28, and the air inlet opening 31 are so arranged that a powerful and constant stream of air flows over the diagonally extending plate 29. As the pulverized material drops through the screen 20 the material is caught in suspension in this air stream and is immediately diverted and projected toward the material inlet opening 34. The baffle 32 serves to channel this incoming air stream along the bottom and sides of the downwardly extending trough 30. Since the pulverized material is thus caught in suspension in this continually moving air stream, the material will be forcefully projected thru the opening 33, and will not clog up said opening, thereby assuring efficient functioning of the mill at all times. In view of the diagonally extending construction of the throat 30 and the position of the air inlet 31 the suction device is continually emptying the material from the material receiving chamber 30' without interference or excessive piling up of the material. It can be seen therefore that the unique construction of the trough 30 serves to assure the constant supply of pulverized material to the suction means. Material which may be lodged within the material receiving inlet 34 may be dislodged by an air stream entering through the auxiliary air opening 36. Thus a suitable and improved construction is provided for removing and conveying pulverized material.

Although the foregoing description and drawing refer to a mill of the type used in reducing feed or the like, it will be appreciated that the invention contemplates the provision of the foregoing features on other types of material reducing machines.

It will be further understood that only a preferred form of construction has been illustrated and described, and that numerous modifications and alterations may be made therein without departing from the spirit and scope of the invention as defined in the appended claim.

What is claimed is:

A hammer mill comprising a casing having upright spaced walls, a screen transversely positioned between said walls to divide said casing into an upper chamber for the comminution of material and a lower material receiving chamber, a suction means connected adjacent the lower end of one of said walls, said suction means including a conduit having a horizontal portion with an opening in communication with the lower end of said material receiving chamber and an upwardly extending elbow, a first air inlet for the receiving chamber, said air inlet being positioned on one of said walls substantially adjacent the screen, a deflection plate positioned above said air inlet, said deflection plate being arranged to divert material from the first inlet opening toward the suction conduit, a lower plate positioned transversely between the walls, said plate being positioned immediately below the first air inlet opening and sloping downwardly toward the opening of said conduit, a second air inlet formed in one of said walls below the sloping bottom plate, and a transversely extending baffle within the conduit, said baffle being vertically spaced from the bottom of said conduit and extending longitudinally substantially beyond the opening of the conduit and terminating substantially adjacent the elbow to provide an air passage separate from and by-passing the material receiving chamber, said second air inlet being arranged to provide an incoming air stream to the passage.

JOHN R. HALL.

REFERENCES CITED

The following references are of record in the file of this patent:

UNITED STATES PATENTS

| Number | Name | Date |
| --- | --- | --- |
| 1,558,502 | Power | Oct. 27, 1925 |
| 1,713,094 | Saiberlich | May 14, 1929 |
| 2,325,886 | Sisulak | Aug. 3, 1943 |